US012610082B2

(12) United States Patent
Mohammed et al.

(10) Patent No.: US 12,610,082 B2
(45) Date of Patent: Apr. 21, 2026

(54) UNRESTRICTED INTRA CONTENT TO IMPROVE VIDEO QUALITY OF REAL-TIME ENCODING

(71) Applicant: Intel Corporation, Santa Clara, CA (US)

(72) Inventors: Atthar Mohammed, Folsom, CA (US); Syed Ahsan, Folsom, CA (US); Satya Raviteja Erpina, San Jose, CA (US); Rupali Kumari, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 959 days.

(21) Appl. No.: 17/457,884

(22) Filed: Dec. 6, 2021

(65) Prior Publication Data

US 2022/0094984 A1　　Mar. 24, 2022

(51) Int. Cl.
| | |
|---|---|
| *H04N 19/61* | (2014.01) |
| *H04N 19/12* | (2014.01) |
| *H04N 19/159* | (2014.01) |
| *H04N 19/176* | (2014.01) |
| *H04N 19/42* | (2014.01) |
| *H04N 19/436* | (2014.01) |
| *H04N 19/593* | (2014.01) |
| *H04N 19/625* | (2014.01) |

(52) U.S. Cl.
CPC ............. *H04N 19/61* (2014.11); *H04N 19/12* (2014.11); *H04N 19/159* (2014.11); *H04N 19/176* (2014.11); *H04N 19/42* (2014.11); *H04N 19/436* (2014.11); *H04N 19/593* (2014.11); *H04N 19/625* (2014.11)

(58) Field of Classification Search
None
See application file for complete search history.

(56) References Cited

U.S. PATENT DOCUMENTS

| | | | | | |
|---|---|---|---|---|---|
| 5,140,542 | A | * | 8/1992 | Taliercio | ................. G06F 17/16 708/401 |
| 5,748,770 | A | * | 5/1998 | Hajjahmad | ............. H04N 19/18 375/E7.206 |
| 7,439,883 | B1 | * | 10/2008 | Moni | .................... H04N 19/423 341/60 |
| 11,163,852 | B2 | * | 11/2021 | Budagavi | ............... H04N 19/60 |

(Continued)

FOREIGN PATENT DOCUMENTS

| | | | | | |
|---|---|---|---|---|---|
| AU | 2013344305 | A1 | * | 3/2015 | ............... G06T 9/40 |
| CN | 108432246 | B | * | 2/2023 | ........... H04N 19/119 |

(Continued)

*Primary Examiner* — Mohammed Jebari
(74) *Attorney, Agent, or Firm* — Hanley, Flight & Zimmerman, LLC

(57) ABSTRACT

This disclosure describes systems and methods for unrestricted intra content to improve video quality of real-time encoding. An example method may include receiving, at a logic gate included within an encoding pipeline of a video encoder, a first transform unit (TU) of a first size. The example method may also include receiving, at the logic gate, a second transform unit (TU) of a second size, wherein the first size and the second size are different. The example method may also include generating, using the logic gate, a first forward transform of the first TU and a second forward transform of the second TU.

18 Claims, 6 Drawing Sheets

400 ➔

(56)                    References Cited

U.S. PATENT DOCUMENTS

| | | | | |
|---|---|---|---|---|
| 2005/0141776 A1* | 6/2005 | Dang | ...................... | H04N 19/42 |
| | | | | 382/250 |
| 2013/0114732 A1* | 5/2013 | Dong | ................... | H04N 19/61 |
| | | | | 375/240.19 |
| 2015/0172661 A1* | 6/2015 | Dong | ................... | H04N 19/126 |
| | | | | 375/240.03 |
| 2015/0249828 A1* | 9/2015 | Rosewarne | .......... | H04N 19/186 |
| | | | | 375/240.02 |
| 2016/0029046 A1* | 1/2016 | Li | ........................... | G06T 9/007 |
| | | | | 375/240.2 |
| 2016/0241868 A1* | 8/2016 | Li | ........................... | H04N 19/57 |
| 2017/0094274 A1* | 3/2017 | Chien | ................ | H04N 19/159 |
| 2017/0155906 A1* | 6/2017 | Puri | .................... | H04N 19/122 |
| 2020/0045313 A1* | 2/2020 | Leleannec | ........... | H04N 19/176 |
| 2020/0304816 A1* | 9/2020 | Zhao | .................... | H04N 19/51 |
| 2021/0218996 A1* | 7/2021 | Koo | .................... | H04N 19/176 |
| 2022/0312013 A1* | 9/2022 | Koo | .................... | H04N 19/625 |
| 2023/0069387 A1* | 3/2023 | Zhao | .................... | H04N 19/44 |
| 2023/0108690 A1* | 4/2023 | Koo | .................... | H04N 19/96 |
| | | | | 375/240.03 |

FOREIGN PATENT DOCUMENTS

| | | | | |
|---|---|---|---|---|
| WO | WO-2013109471 A1 * | 7/2013 | ........... | H04N 19/126 |
| WO | WO-2014071439 A1 * | 5/2014 | ............... | G06T 9/40 |

* cited by examiner

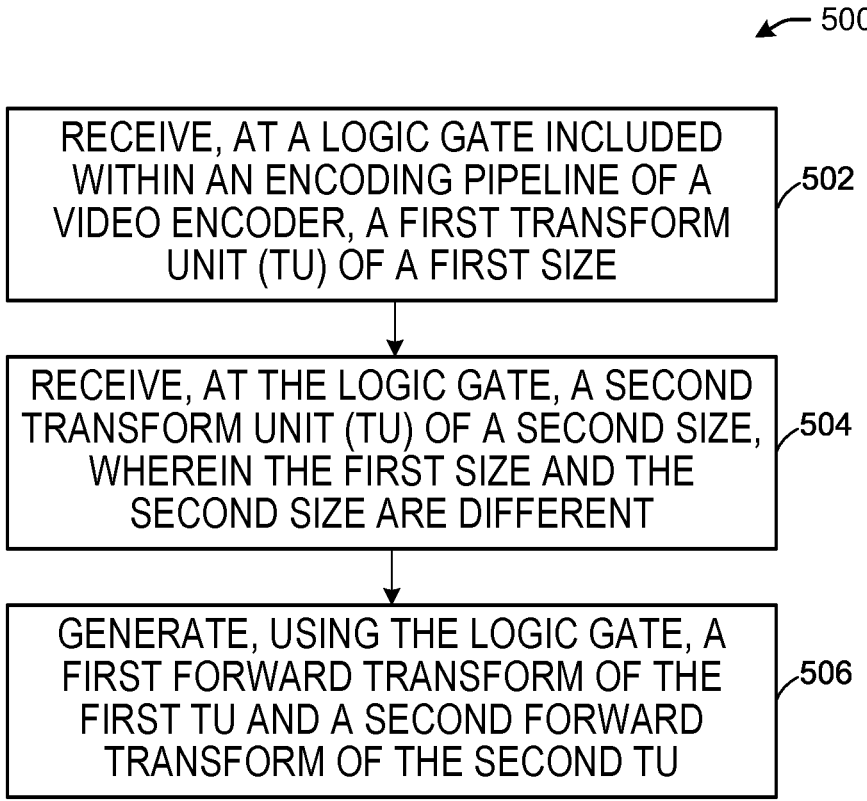

┌── 500

RECEIVE, AT A LOGIC GATE INCLUDED
WITHIN AN ENCODING PIPELINE OF A
VIDEO ENCODER, A FIRST TRANSFORM
UNIT (TU) OF A FIRST SIZE — 502

RECEIVE, AT THE LOGIC GATE, A SECOND
TRANSFORM UNIT (TU) OF A SECOND SIZE,
WHEREIN THE FIRST SIZE AND THE
SECOND SIZE ARE DIFFERENT — 504

GENERATE, USING THE LOGIC GATE, A
FIRST FORWARD TRANSFORM OF THE
FIRST TU AND A SECOND FORWARD
TRANSFORM OF THE SECOND TU — 506

FIG. 5

UNRESTRICTED INTRA CONTENT TO IMPROVE VIDEO QUALITY OF REAL-TIME ENCODING

TECHNICAL FIELD

This disclosure generally relates to systems, devices, and methods for video encoding and, more particularly, to unrestricted intra content to improve video quality of real-time encoding.

BACKGROUND

There are several techniques used to enhance video quality and the prediction of pixels from neighboring blocks is one of them, but this comes with the challenges on hardware encoder performance to do real-time encoding of high-resolution images. The other options for real-time encoding would be either lower the video quality or lower the resolution.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 5 illustrates an example method, in accordance with one or more embodiments of this disclosure.

Figure 1:
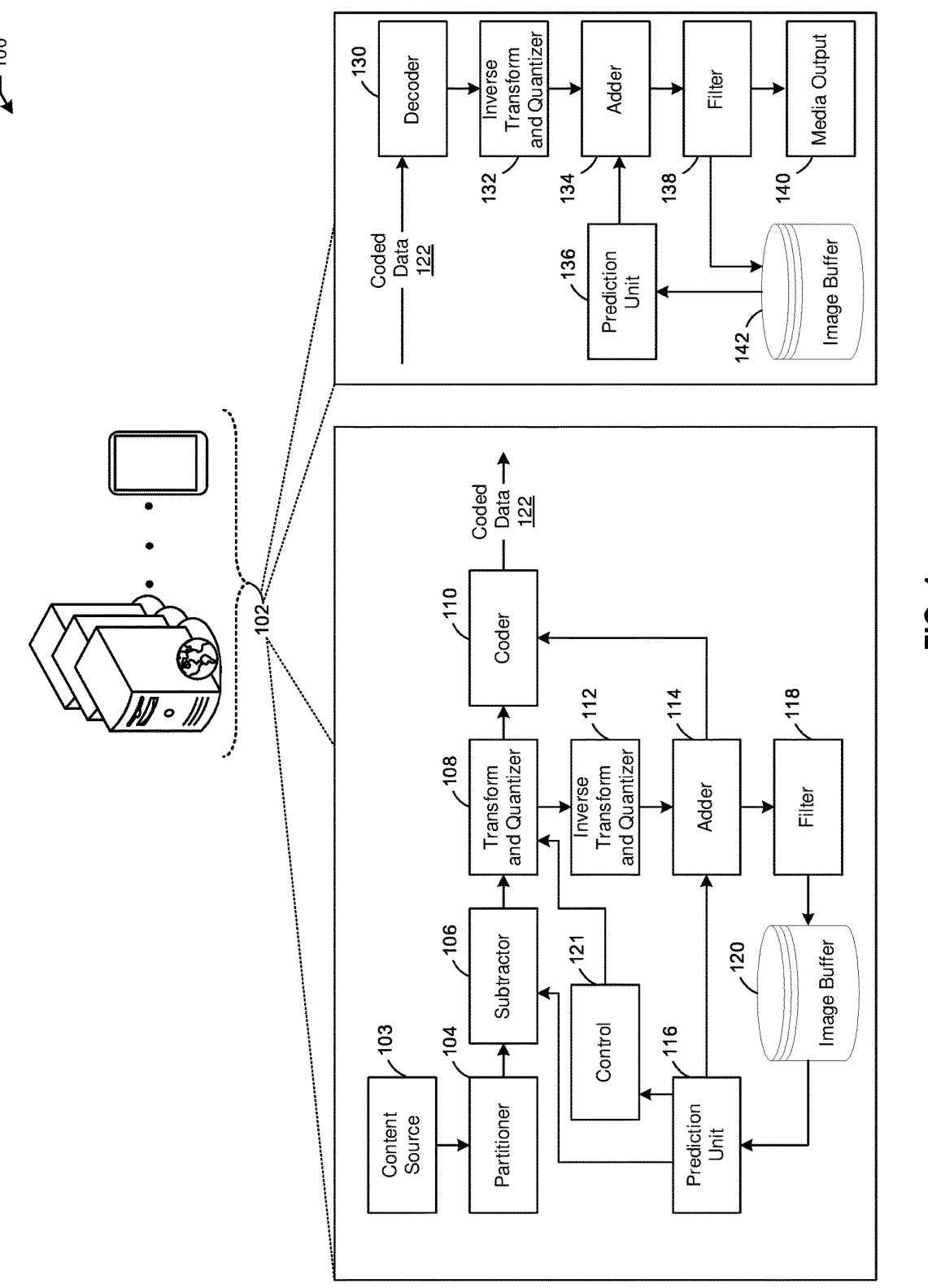
FIG. 1 illustrates an example system, in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A typical video encoding and decoding system may include a transmitting device configured to receive source video and compress (e.g., encode) video data of the source video for transmission to a receiving device. This compressed data may be transmitted to the receiving device as a "bit stream." The receiving device may be configured to decode the compressed video data received from the transmitting device. For example, the transmitting device may be a source of video content and the receiving device may be a device on which a viewer is watching the video content (and/or the receiving device may be a third device that may decode the video and provide the decoded video content to the device on which the viewer is watching the video content). The video content at the source may be compressed to maximize video quality and throughput by allowing a video frame including a large number of pixels to be compressed into a smaller amount of data to provide for quicker transmission and processing at the receiving device.

At a high-level, the encoding process may involve at least the following operations. First, a video frame may be received in the form of a number of pixels. The video frame may be separated into different coding units (CU), which may include groups of pixels included in the frame and/or information associated with the pixels, such as luma and chroma information. A predicted block may be generated, which may involve comparing the pixel data associated with the current frame to a reference image, which may be representative of a previously coded frame in the video content (e.g., inter-coding), and/or which may be representative of previously coded pixel data of the same frame (e.g., intra-coding). The predicted block then may be subtracted (e.g., at a subtractor) from the current block of original image data, and the resulting residual (e.g., representing the difference between the predicted block and the original image data) may be partitioned into one or more transform blocks (TUs). The TUs may then be provided to a forward transform stage at which the pixel data included in the TU is converted into a domain of transform coefficients. Following this, the transformed TU is provided to a quantizer stage. The forward transform and the quantizer stages can transform the divided residual data into transform coefficients using discrete cosine transform (DCT) for example. Using a quantization parameter (QP) set by the system, the transform and quantizer then uses lossy resampling or quantization on the coefficients. The frames and residuals along with supporting or context data block size and so forth may be entropy encoded by the coder and transmitted to the receiving device. The forward transform process may involve multiplying the TU matrix (for example, a 4×4 TU would be a matrix including four rows and four columns) by a constant matrix including pre-determined constant values.

The output of the transform and quantizer may be provided to the inverse transform and quantizer to generate the same reference or reconstructed blocks, frames, or other units as would be generated at a decoder such as decoder. Thus, the prediction unit may use the inverse transform and quantizer, adder, and filter to reconstruct the frames.

The prediction unit may perform inter-prediction including motion estimation and motion compensation, intra-prediction according to the description herein, and/or a combined inter-intra prediction. The prediction unit may select the best prediction mode (including intra-modes) for a particular block, typically based on bit-cost and other factors. The prediction unit may select an intra-prediction and/or inter-prediction mode when multiple such modes of each may be available. The prediction output of the prediction unit in the form of a prediction block may be provided both to the subtractor to generate a residual, and in the decoding loop to the adder to add the prediction to the reconstructed residual from the inverse transform to reconstruct a frame. In this regard, an intra feedback loop may exist at the encoder side.

Intra prediction provides quality gain but results in inherent problems. For example, one limitation of using this feedback loop is that individual TUs may be required to be serially processed. That is before a second TU can be processed, the first TU may need to be processed by the entire loop. This may lead to bottlenecking issues, especially when a video frame is segmented into a large number of smaller-sized TUs (for example, 4×4 sized TUs) as opposed to a small number of larger-sized TUs (for example, 64×64 sized TUs). These smaller TUs may be more heavily penalized in terms of reduced throughput because even though each individual TU includes a smaller amount of data than a larger TU, only one of these smaller TUs may be processed through the feedback loop at a time, so the larger number of smaller TUs may result in a larger amount of serial processing being performed, which lead to increases in processing time for a given video frame. There is a need to improve video frame processing time by enhancing the hardware configuration included in an intra feedback loop.

Example embodiments of the present disclosure relate to systems, methods, and devices for unrestricted intra content to improve video quality of real-time encoding. Particularly, the systems, methods, and devices described herein may improve on the configuration of the hardware included in the intra feedback loop on the encoder side of a video encoding and/or decoding system.

Many times, intra predicted blocks are not selected due to performance concerns, but the improved hardware configurations described herein mitigate or eliminate these limitations. This may increase the quality of an encoded video stream by allowing more intra predicted blocks to be processed within a given time frame (e.g., increase the throughput of the bit stream). Consequentially, an encoding device has the capability to encode high resolution video streams while maintaining high quality and frames per second (fps) for the video content. Additionally, the improved performance may result in better battery life for devices involved in a video encoding and decoding system. The systems, methods, and devices described herein may be applicable to a variety of encoding standards (e.g., AOMedia Video 1 (AV1) video encoding standard or other video encoding and/or decoding standards).

In one or more embodiments, the systems and methods described herein may enhance typical feedback loop in a number of different ways. First, larger gates may be added and shared between different TU (transform unit) sizes as opposed to dedicated gates based on a per TU size. The hardware used in association with forward transform and inverse transform blocks in the feedback loop may be increased in size (for example, may be increased by twice the typical size, and/or any other increase in size) and shared with smaller TUs to increase the overall throughput of the feedback loop. In this manner, the hardware required to perform the same amount of computations may be reduced, while simultaneously increasing the throughput. To cause the increased throughput, these shared gates may be configured to process 16 coefficients per clock cycle for smaller TUs. This allows the feedback loop to serially process individual smaller TUs (for example, 16×16, 8×8, and 4×4 sized TUs) quicker to provide enhanced throughput in the pipeline.

Given that the forward transform process may involve multiplying the TU matrix by a constant matrix including pre-determined constant values, in a typical feedback loop, the gates associated with individual TU sizes may often be associated with static matrix sizes that are particular to a given TU size. For example, for a 4×4 TU, a coefficient matrix may be sized such that a row of the TU may be multiplied by a column of the coefficient matrix, or vice versa. In contrast, because the improved feedback loop described herein consolidates these individual gates into one or more shared gates (for example, gates that are involved in computations for TUs of different sizes), a constant matrix is implemented in the forward transform that is able to be used in matrix multiplication with any TU, regardless of the TU size. Additionally, in order to process smaller TUs quicker (for example, 16 coefficients per lock as aforementioned), instead of maintaining the TU as a 4×4 matrix, all of the TU data may be added to a single column, and thus the matrix multiplication may involve only one column multiplied by one row of the constant matrix. This may allow all 16 coefficients of a 4×4 matrix to be calculated in one operation (for example, as quickly as within a single clock cycle. Additional details about the specific matrix and the operations performed using this matrix may be found in at least the description associated with FIG. 4.

In one or more embodiments, the systems and methods may enhance previous feedback loop configurations by altering the operations performed in the forward and inverse transform portions of the loop. In prior configurations, the output of the forward transform was a row. Given this, a buffer was required after the forward transform and before the inverse transform to convert the row output to column format for processing by the inverse transform. This may add additional hardware complications and potential data bottlenecks into the feedback loop. To mitigate or eliminate the need for this buffer, the forward transform and inverse transform are both separated into two stages that allows the inverse transform to receive a row as an input, and produce a column as an output. Specifically, the two stages at the forward transform may include first performing a vertical forward transform and second performing a horizontal forward transform. This may result in a row being provided to the inverse transform portion of the loop as an input. The inverse transform portion may then also involve two stages. First, a horizontal inverse transform, and second, a vertical inverse transform. In this manner, the inverse transform portion may be able to process the output of the forward transform directly (the row output) without having to convert the row output to a column format using a buffer before the inverse transform portion. Additional details about these two stages for the forward transform and the inverse transform may be found in at least the description associated with FIGS. 2 and 4.

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof except for IBC prediction mode operations where mentioned herein.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 108 may be provided to the inverse transform and quantizer 112 to generate the same reference or reconstructed blocks, frames or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparisons of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

In one or more embodiments, system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bit stream to reconstruct a predicted block. The prediction unit 136 may set the correct prediction mode for each block, where the prediction mode may be extracted and decompressed from the compressed bit stream.

In one or more embodiments, the coded data 122 may include both video and audio data. In this manner, the system 100 may encode and decode both audio and video.

It is understood that the above descriptions are for purposes of illustration and are not meant to be limiting.

Figure 2:
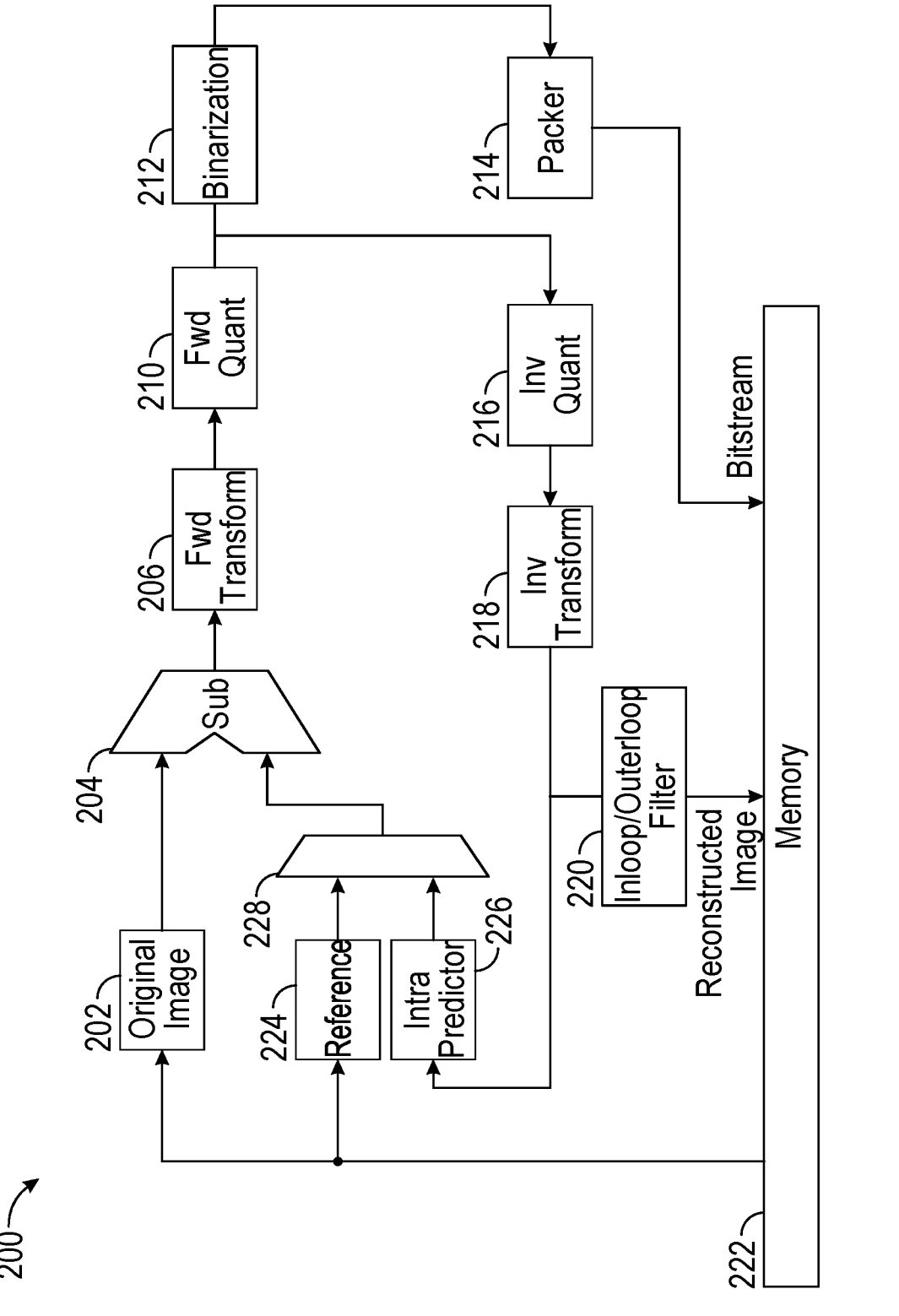
FIG. 2 illustrates an example system, in accordance with one or more embodiments of the disclosure.

FIG. 2 illustrates an example system 200, in accordance with one or more embodiments of the disclosure.

FIG. 2 may illustrate the encoder pipeline in which the one or more gates that are capable of processing different-sized TUs may be implemented. That is, FIG. 2 depicts the encoder side of the system 100 illustrated in FIG. 1. The system 200 may also illustrate the intra prediction loop 201 mentioned above. The system 200 may include similar elements as the system 100. For example, the subtractor 204 may be similar to subtractor 106, the forward transform 206 and forward quantizer 210 may be similar to transform and quantizer 108, inverse quantizer 216 and inverse transform 218 may be similar to inverse transform and quantizer 112, intra predictor 226, reference image 224, and multiplexer 228 may be similar to prediction unit 116, original image 202 may be similar to content source 103, etc.

The system 200 may improve upon previous intra prediction loop configurations by using larger gates made be added and shared between different TU (transform unit) sizes. The hardware used in association with forward transform 206 and inverse transform 218 blocks in the feedback loop 201 may be increased in size (for example, may be increased by twice the typical size, and/or any other increase in size) and shared with smaller TUs to increase the overall throughput of the feedback loop. Any other gates included in the system 200 may also be increased in size. In this manner, the hardware required to perform the same amount of computations may be reduced, while simultaneously increasing the throughput. To cause the increased throughput, these shared gates may be configured to process 16 coefficients per clock cycle for smaller TUs. This allows the feedback loop to serially process individual smaller TUs (for example, 16×16, 8×8, and 4×4 sized TUs) quicker to provide enhanced throughput in the pipeline.

The system 200 may also improve upon previous intra prediction loop configurations by altering the operations performed in the forward and inverse transform portions of the loop. In prior configurations, the output of the forward transform 206 was a row. Given this, a buffer was required after the forward transform 206 and before the inverse transform 218 to convert the row output to column format for processing by the inverse transform. This may add additional hardware complications and potential data bottlenecks into the feedback loop 201. To mitigate or eliminate the need for this buffer, the forward transform 206 and inverse transform 218 are both separated into two stages that allow the inverse transform 218 to receive a row as an input, and produce a column as an output. Specifically, the two stages at the forward transform 206 may include first performing a vertical forward transform and second performing a horizontal forward transform. This may result in a row being provided to the inverse transform 218 portion of the loop as an input. The inverse transform 218 portion may then also involve two stages. First, a horizontal inverse transform, and second, a vertical inverse transform. In this manner, the inverse transform 218 portion may be able to process the output of the forward transform 206 directly (the row output) without having to convert the row output to a column format using a buffer before the inverse transform portion.

Figure 3:
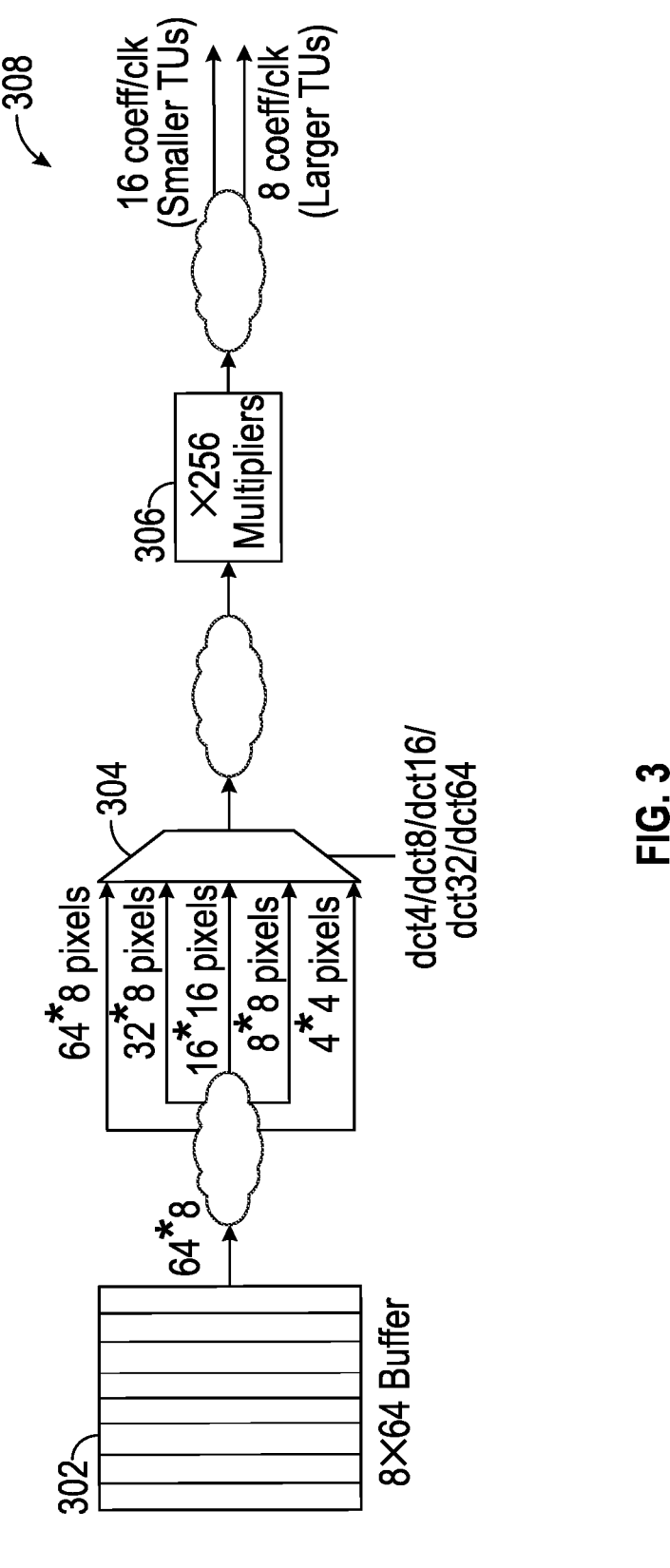
FIG. 3 illustrates an example system, in accordance with one or more embodiments of the disclosure.

FIG. 3 illustrates an example system 300, in accordance with one or more embodiments of the disclosure.

The system 300 may provide a simplified depiction of a system that uses one or more logic gates that are configured to process different sized TUs as described herein. In some embodiments, the system may include a buffer 302, one or more logic gates 304 and/or a multiplier 306. The system 300 may also include any other number of components described herein or otherwise. That is, the system 300 is not intended to be limiting to the components depicted in FIG. 3. The system 300 may still include some or all of the components illustrated in FIGS. 1-2 and 6 (or any other components), but may be presented in a simplifier manner to better illustrate the functionality of the shared logic gates.

In some embodiments, the buffer 302 may exist at the encoder side of the system and may hold any TUs associated with a frame that is being processed by the encoding pipeline depicted in FIG. 2. That is, given that the TUs are processed serially, only one TU at a time may be being processed by the encoding pipeline. The remaining TUs associated with the frame may thus need a storage location until they are able to be processed through the encoding pipeline as well. The one or more logic gates 304 may refer to the unique components that comprise the encoding pipeline. In some cases, the logic gates may be hardware components that may be used to process the TUs. For example, the forward transform 206 depicted in FIG. 2 may be an example of one logic gate. The other blocks within the encoding pipeline may represent additional logic gates. In some cases, however, the blocks may represent more than one logic gate as well. Furthermore, in some cases, the encoding pipeline may be in a software form rather than existing as hardware logic gates.

The multiplier 306 may be a matrix including one or more constant values. The multiplier 306 may be used to perform the forward transform (and/or inverse transform) of any TUs that are being passed through the encoding pipeline. The matrix operations performed using the multiplier 306 may be described in additional detail with respect to FIG. 4 (for example, the multiplier 306 may be a constant matrix, such as the second matrix 406 or the matrix 414). Whereas some systems may involve the use of individual matrix multipliers that are dedicated to particular TU sizes, the multiplier 306 may be a generic matrix that may be used for TUs of any size. This may allow a single gate to process multiple TUs of different sizes. In this manner, the system 300 also illustrates that a column of residuals may be multiplexed among all TU sizes, where the residuals are multiplied by a corresponding row of the constant matrix. In some cases, there may be 256 multipliers required, eight residual columns (64 values deep each) multiplied by one constant row (64 values wide) for larger TUs (for example, 64×64 and/or 32×32) to generate a partial product after vertical transformation. The same multipliers may be used for 16×16 sized TUs to produce 16 coefficients (16 columns of residuals multiplied by one row of constants), and similarly only ½ and ¼th number of multipliers may be required for 8×8 TUs and 4×4 TUs, respectively to produce 16 coefficients per clock cycle. The output of the system 300 may include a number of TU residual coefficients 308. To cause the increased throughput, these shared gates may be configured to process 16 coefficients per clock cycle for smaller TUs. This allows the feedback loop to serially process individual smaller TUs (for example, 16×16, 8×8, and 4×4 sized TUs) quicker to provide enhanced throughput in the pipeline.

Figure 4:
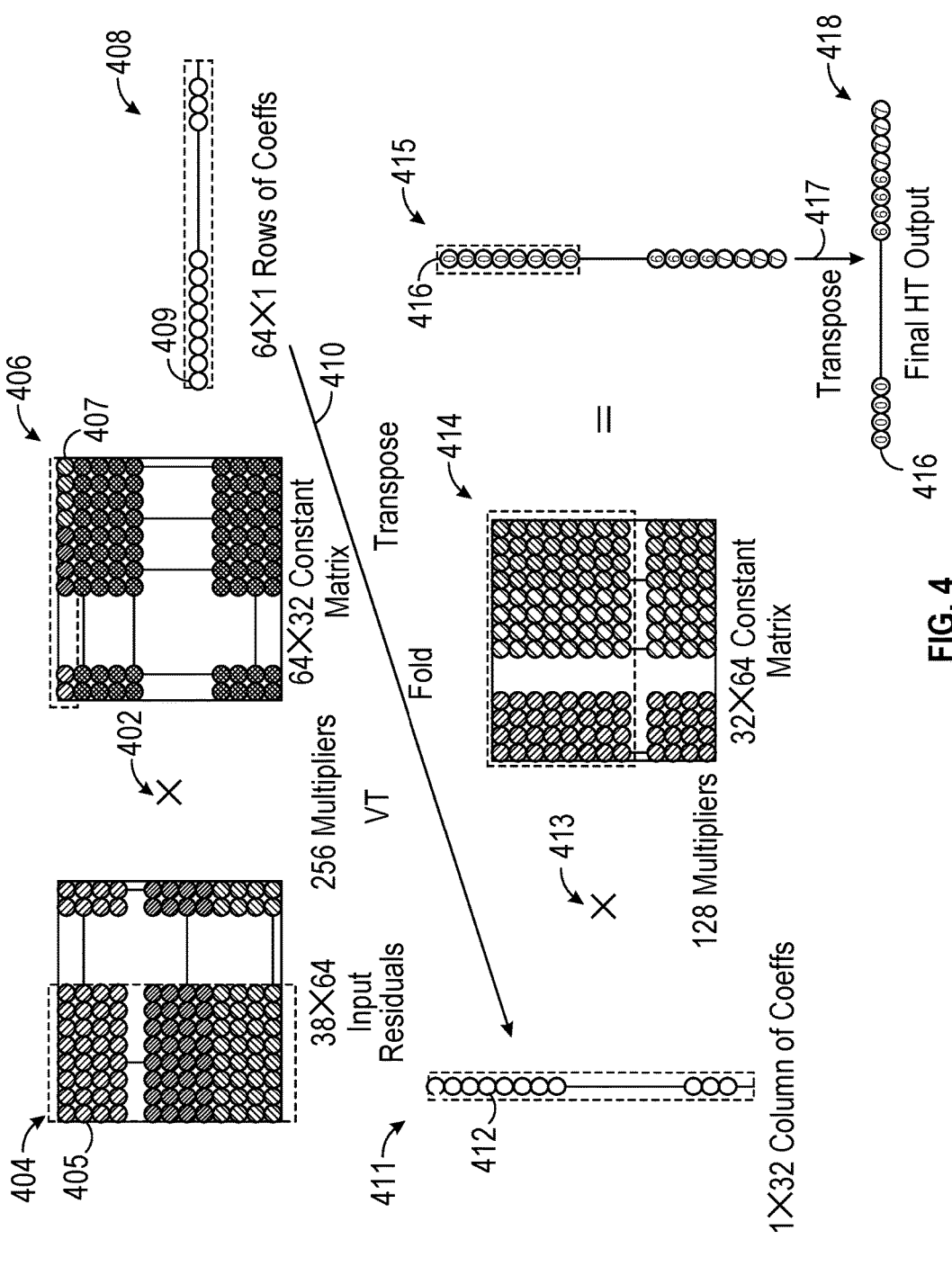
FIG. 4 illustrates an example flow diagram, in accordance with one or more embodiments of the disclosure.

FIG. 4 illustrates an example flow diagram 400, in accordance with one or more embodiments of the disclosure.

Particularly, the flow diagram 400 illustrates matrix operations that may be performed in the shared gates to allow a single gate to handle processing of different sized TUs. Particularly, the operations illustrated in the figure may represent operations performed in the forward transform at the encoder side (for example, at least a portion of the transform and quantizer 108 in FIG. 1 and the forward transform 206 in FIG. 2). The forward transform stage may involve converting the pixel data included in the TU into a domain of transform coefficients. Following the matrix operations illustrated in FIG. 4, quantization may be performed to remove information and compress the data for transmission across the bit stream.

As aforementioned, the forward transform and inverse transform may both be separated into two stages that allow the inverse transform to receive a row as an input, and produce a column as an output. Specifically, the two stages at the forward transform may include first performing a vertical forward transform and second performing a horizontal forward transform. This may result in a row being provided to the inverse transform portion of the loop as an input. The vertical forward transform and horizontal forward transform are illustrated in this figure and described with respect to operations 402 (e.g., vertical forward transform) and 413 (e.g., horizontal forward transform).

In some embodiments, the flow diagram 400 begins with operation 402, which may involve performing the vertical forward transform. That is, operation 402 may involve multiplying a first matrix 404 by a second matrix 406 to produce a row of residual coefficients (the first set of coefficients 408). The first matrix 404 may be a matrix including residual data of a TU for which the forward transform is being performed. That is, each entry 405 in the first matrix 404 may represent a single instance of residual data included within a TU. The second matrix 406 may be a constant matrix (for example, represented as the multiplier 306 in FIG. 3). That is, each entry 407 in the second matrix 406 may be a constant value. The matrix multiplication may involve multiplying a column of the first matrix 404 by a row of the second matrix 406. The resulting values may then be summed to produce a single residual coefficient. In this manner, a single column by row multiplication operation produces one coefficient. This process may then be repeated for any remaining columns in the first matrix 404 to produce the remaining residual coefficients for the TU.

In some embodiments, the configuration of the multiplier (for example, the constant matrix 406) may be based on a number of coefficients that are desired to be produced in a single clock cycle. As one non-limiting example, it may be desired to produce eight residual coefficients per clock cycle. In this scenario, it may be necessary to process eight columns of the first matrix 404 within the one clock cycle to produce the eight residual coefficients. Given this, the second matrix 406 may be configured to allow for eight columns of the first matrix 404 to be processed. As one example, in order to produce eight coefficients per clock for a 64×64 sized TU, eight columns of the first matrix 404 are multiplied by one row of the second matrix 406. In this manner, eight columns of 32 coefficients and one row of the constant matrix produce eight coefficients. In the next clock, the next eight columns of 32 coefficients of the first matrix 404 and the same one row (or a different row) of the second matrix 406 are used to produce the next eight coefficients. Once all 32 columns of coefficients are multiplied by the first row of constant matrix, one row of vertically transformed coefficients (64×1) is generated. It should be noted that the second matrix 406 being configured to allow eight coefficients to be produced per clock cycle is not intended to be limiting, and the second matrix 406 may similarly be reconfigured to allow for a different number of coefficients to be produced per clock cycle as well.

As aforementioned, the second matrix 406 also needs to be able to perform matrix multiplication for smaller TUs (for example, 16×16, 4×4, etc.). Additionally, it may be desired for smaller TUs to be processed faster than larger TUs because the TUs are processed serially. Separating a fixed frame into smaller TUs would produce a large number of TUs than if the frame were separated into smaller TUs. Thus, more processing time may result from processing the larger number of smaller TUs than the smaller number of larger TUs. Given this, it may be desirable to produce a larger number of coefficients per clock cycle for the smaller TUs to allow for larger numbers of smaller TUs to be processed in a given amount of time. To accomplish this, instead of using a matrix that represents the same number of rows and columns included in the TU (for example, a 4×4 TU may have four rows and four columns), all of the data included in a smaller TU can be added to one column of the first matrix 404 that is multiplied by the second matrix 406. In this way, the matrix multiplication for a smaller TU may only require a multiplication operation involving one column of the first matrix 404 and one row of the second matrix 406.

Operation 402 is followed by operation 410, which involves transposing and folding (for example, performing addition based on matrix symmetry) the first set of coefficients 408. This converts the first set of coefficients 408, which is a horizontal row, into a second set of coefficients 411, which is in the form of a vertical column. The second set of coefficients 411 may also be half the size of the first set of coefficients 408. For example, FIG. 4 may show the second set of coefficients 411 as being a column of 32 coefficients, whereas the first set of coefficients 408 was a row of 64 coefficients. This may be performed because the constant matrix (for example, the second matrix 406) is symmetrical column-wise.

Additionally, the second matrix 406 may also be transposed. Transform symmetry may be exploited. the last 32 columns are derived as the i-th element is equal to the (64−i)-th element for even indexed rows and the i-th element is equal to the negative of the (64−i)-th element for odd indexed rows. This enabled storing of a half matrix (the first 32 columns of 64×64 constants). Residual matrix row size is reduced to half (64 becomes 32) by doing addition before the multiplication by utilizing constant matrix symmetry. This makes the row numbers by half of the residual matrix. As the symmetry is considered, one column of 64 coefficients becomes 32 coefficients and this is multiplied by one row of the constant matrix. This produces one coefficient after the multiplication.

Operation 410 is followed by operation 413, which involves performing a horizontal transform on the second set of coefficients 411. To accomplish this, the second set of coefficients 411 is multiplied by a third matrix 414, which is a transposed version of the second matrix 406. The horizontal transform is similar to the vertical transform and may use same number of multipliers. The number of multipliers and buffer size is optimized for eight coefficients/clock output for the maximum TU size of 64×64 for both vertical transform and horizontal transform stages. For smaller TU sizes (TU height/width equal to 4, 8, 16), 16 coefficients are produced by reusing the same number of multipliers and size buffers. The output of the operation 413 may include a third set of coefficients 415. Finally, operation 417 may involve transposing the third set of coefficients 415 to produce a fourth set of coefficients 418 in a horizontal arrangement.

FIG. 5 illustrates an example method 500, in accordance with one or more embodiments of this disclosure.

Block 502 of the method 500 may include receiving, at a logic gate included within an encoding pipeline of a video encoder, a first transform unit (TU) of a first size. Block 504 of the method 500 may include receiving, at the logic gate, a second transform unit (TU) of a second size, wherein the first size and the second size are different. Block 506 of the method 500 may include generating, using the logic gate, a first forward transform of the first TU and a second forward transform of the second TU.

In some embodiments, the method 500 may also include generating a vertical forward transform of the first TU. The method 500 may also include generating a horizontal forward transform of the first TU subsequent to determining the vertical forward transform.

In some embodiments, the method 500 may also include generating, subsequent to determining the first forward transform of the first TU, a first inverse transform of the first TU, wherein generating the first inverse transform comprises: generating a horizontal inverse transform of the first TU and generating a vertical inverse transform of the first TU subsequent to determining the horizontal inverse transform.

In some embodiments, the first size is smaller than the second size, wherein generating the first forward transform of the first TU further comprises generating a first set of residual coefficients, wherein generating the second forward transform of the second TU further comprises generating a second set of residual coefficients, and wherein the first set of residual coefficients is greater than the second set of residual coefficients.

In some embodiments, the first set of residual coefficients is 16 coefficients produced every clock cycle, and wherein the second set of residual coefficients is 8 coefficients produced every clock cycle.

In some embodiments, generating the first forward transform further comprises generating a first product of a first matrix including one or more first values included within the first TU and a constant matrix, and wherein generating the second forward transform further comprises generating a second product of second matrix including one or more second values included within the second TU and the constant matrix.

In some embodiments, the first size is smaller than the second size, and wherein the first matrix includes the one or more first values within a single column.

Figure 6:
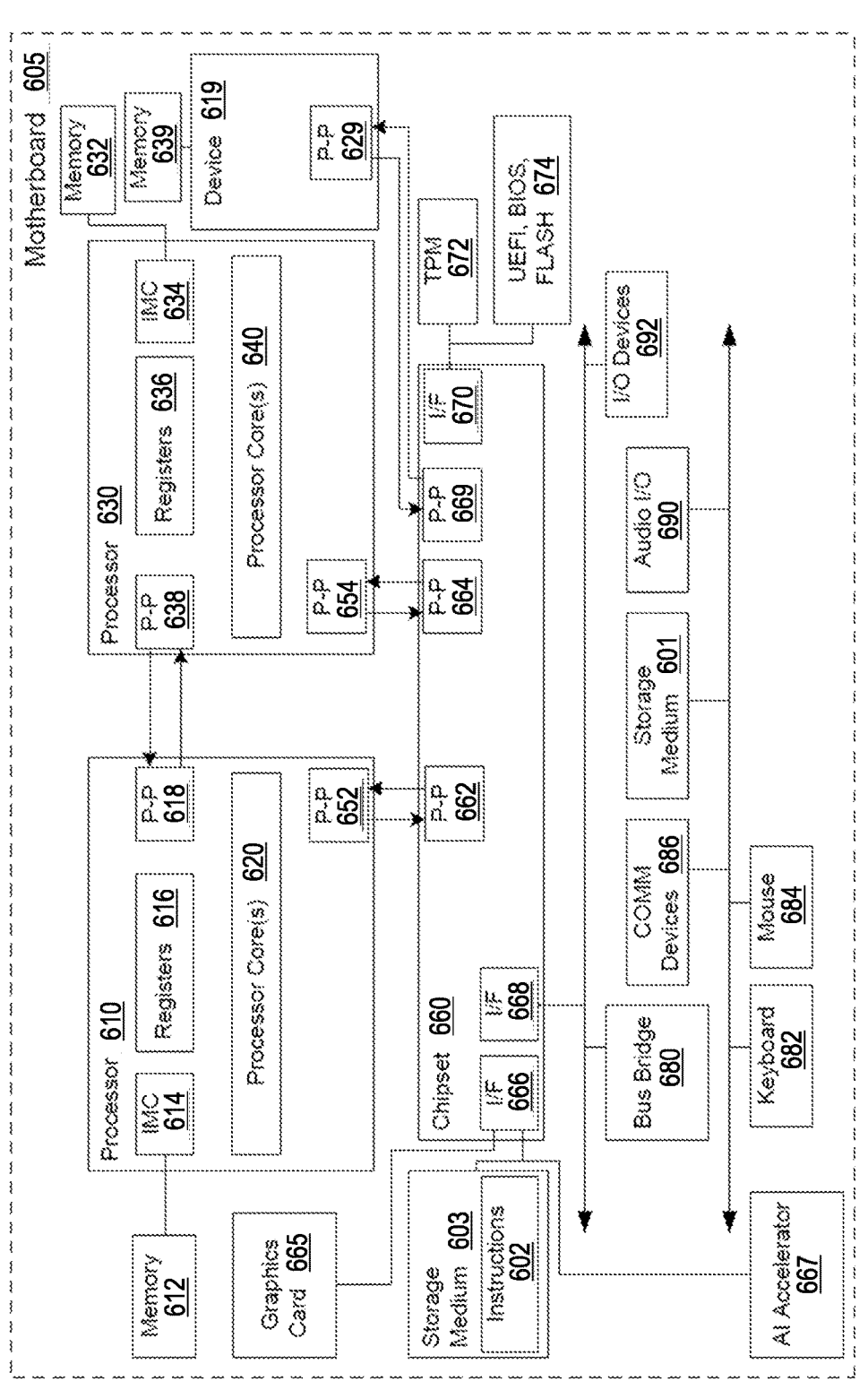
FIG. 6 illustrates an example of a computing system, in accordance with one or more embodiments of this disclosure.

FIG. 6 illustrates an embodiment of an exemplary system 600, in accordance with one or more example embodiments of the present disclosure.

In various embodiments, the system 600 may comprise or be implemented as part of an electronic device.

In some embodiments, the system 600 may be representative, for example, of a computer system that implements one or more components of FIG. 1.

The embodiments are not limited in this context. More generally, the system 600 is configured to implement all logic, systems, processes, logic flows, methods, equations, apparatuses, and functionality described herein and with reference to the figures.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, hand-held device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIG. 1. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point (P-P) interconnect platform that includes a processor 610, a processor 630 coupled via a P-P interconnects/interfaces as an Ultra Path Interconnect (UPI), and a device 619. In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. Some platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 610 includes an integrated memory controller (IMC) 614 and P-P interconnects/interfaces 618 and 652. Similarly, the processor 630 includes an IMC 634 and P-P interconnects/interfaces 638 and 654. The WIC's 614 and 634 couple the processors 610 and 630, respectively, to respective memories, a memory 612, and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include a device 619. The device 619 may be connected to chipset 660 by means of P-P interconnects/interfaces 629 and 669. The device 619 may also be connected to a memory 639. In some embodiments, the device 619 may be connected to at least one of the processors 610 and 630. In other embodiments, the memories 612, 632, and 639 may couple with the processor 610 and 630, and the device 619 via a bus and shared memory hub.

System 600 includes chipset 660 coupled to processors 610 and 630. Furthermore, chipset 660 can be coupled to storage medium 603, for example, via an interface (I/F) 666. The I/F 666 may be, for example, a Peripheral Component Interconnect-enhanced (PCI-e). The processors 610, 630, and the device 619 may access the storage medium 603 through chipset 660.

Storage medium 603 may comprise any non-transitory computer-readable storage medium or machine-readable storage medium, such as an optical, magnetic, or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process 500 of FIG. 5). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interconnects/interfaces 652 and 662 and the processor 630 couples to a chipset 660 via P-P interconnects/interfaces 654 and 664. Direct Media Interfaces (DMIs) may couple the P-P interconnects/interfaces 652 and 662 and the P-P interconnects/interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. The graphics card 665 may implement one or more of processes or operations described herein, (e.g., process 1000 of FIG. 10), and may include components of FIGS. 1-3 (e.g., the partitioner 104 of FIG. 1, the subtractor 106 of FIG. 1, the transform and quantizer 108 of FIG. 1, the coder 50 of FIG. 1, the inverse transform and quantizer 112 of FIG. 1, the adder 114 of FIG. 1, the prediction unit 116 of FIG. 1, the control 121 of FIG. 1, etc.). In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 that couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690.

The artificial intelligence (AI) accelerator 667 may be circuitry arranged to perform computations related to AI. The AI accelerator 667 may be connected to storage medium 601 and chipset 660. The AI accelerator 667 may deliver the processing power and energy efficiency needed to enable abundant data computing. The AI accelerator 667 is a class of specialized hardware accelerators or computer systems designed to accelerate artificial intelligence and machine learning applications, including artificial neural networks and machine vision. The AI accelerator 667 may be applicable to algorithms for robotics, internet of things, other data-intensive and/or sensor-driven tasks.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:
computer-executable instructions;
at least one programmable circuit to be programmed based on the computer-executable instructions to:
cause storage of a first transform unit (TU) in multiple columns of a first matrix, the first TU having horizontal and vertical dimensions of a first size; and
cause storage of a second TU in a single column of the first matrix, the second TU having horizontal and vertical dimensions of a second size, the second size larger than one, the second size smaller than the first size; and
matrix multiplier circuitry to be included in an encoding pipeline of a video encoder, the matrix multiplier circuitry including a plurality of multiplier circuits configurable to multiply elements of a first number of columns of the first matrix with elements of a single row of a second matrix in one clock cycle, the first matrix having a second number of columns in total, the second number larger than the first number, the matrix multiplier circuitry to:
generate a first set of coefficients for the first TU based on multiplication of the first number of columns of the first matrix with the single row of the second matrix in a first clock cycle; and
generate a second set of coefficients for the second TU based on multiplication of the single column of the first matrix with the single row of the second matrix in a second clock cycle after the first clock cycle, the second set of coefficients larger than the first set of coefficients.

2. The system of claim 1, wherein to generate the first set of coefficients, circuit the matrix multiplier circuitry is to:
generate a vertical forward transform of the first TU; and
generate, a horizontal forward transform of the first TU subsequent to generation of the vertical forward transform.

3. The system of claim 2, wherein the matrix multiplier circuitry is to:
generate a horizontal inverse transform of the first TU subsequent to generation of the first forward transform of the first TU; and
generate a vertical inverse transform of the first TU subsequent to generation of the horizontal inverse transform to generate a first inverse transform of the first TU.

4. The system of claim 1, wherein the second set of coefficients includes 16 coefficients produced in the second clock cycle, and the first set of residual coefficients includes 8 coefficients produced in the first clock cycle.

5. The system of claim 1, wherein the second matrix stores values corresponding to a constant matrix.

6. A method comprising:
storing a first transform unit (TU) in multiple columns of a first matrix, the first TU having horizontal and vertical dimensions of a first size;
generating, with matrix multiplier circuitry included in an encoding pipeline of a video encoder, a first set of coefficients for the first TU based on multiplication of a first number of columns of the first matrix with a single row of a second matrix in a first clock cycle, the matrix multiplier circuitry including a plurality of multiplier circuits configurable to multiply elements of the first number of columns of the first matrix with elements of the single row of the second matrix in one clock cycle, the first matrix having a second number of columns in total, the second number larger than the first number;

storing a second TU in a single column of the first matrix, the second TU having horizontal and vertical dimensions of a second size, the second size larger than one, the second size smaller than the first size; and generating, with the matrix multiplier circuitry, a second set of coefficients in a second clock cycle for the second TU based on multiplication of the single column of the first matrix with the single row of the second matrix after the first clock cycle, the second set of residual coefficients larger than the first set of coefficients.

7. The method of claim 6, wherein the generating of the first set of coefficients includes:

generating, with the matrix multiplier circuitry, a vertical forward transform of the first TU; and generating, with the matrix multiplier circuitry, a horizontal forward transform of the first TU subsequent to generating the vertical forward transform.

8. The method of claim 7, including:

generating, with the matrix multiplier circuitry, a horizontal inverse transform of the first TU subsequent to the generating of the first forward transform of the first TU; and generating, with the matrix multiplier circuitry, a vertical inverse transform of the first TU subsequent to the generating of the horizontal inverse transform to generate a first inverse transform of the first TU.

9. The method of claim 6, wherein the second set of coefficients includes 16 coefficients produced in the second clock cycle, and the first set of coefficients includes 8 coefficients produced in the first clock cycle.

10. The method of claim 6, wherein the second matrix stores values corresponding to a constant matrix.

11. A non-transitory computer-readable medium comprising computer-executable instructions to cause at least one programmable circuit to at least:

cause storage of a first transform unit (TU) in multiple columns of a first matrix, the first TU having horizontal and vertical dimensions of a first size;

cause matrix multiplier circuitry included in an encoding pipeline of a video encoder to generate a first set of coefficients for the first TU based on multiplication of a first number of columns of the first matrix with a single row of a second matrix in a first clock cycle, the matrix multiplier circuitry including a plurality of multiplier circuits configurable to multiply elements of the first number of columns of the first matrix with elements of the single row of the second matrix in one clock cycle, the first matrix having a second number of columns in total, the second number larger than the first number;

cause storage of a second TU in a single column of the first matrix, the second TU having horizontal and vertical dimensions of a second size, the second size larger than one, the second size smaller than the first size; and cause the matrix multiplier circuitry, to generate a second set of coefficients for the second TU based on multiplication of the single column of the first matrix with the single row of the second matrix in a second clock cycle after the first clock cycle, the second set of residual coefficients larger than the first set of coefficients.

12. The non-transitory computer-readable medium of claim 11, wherein to generate the first set of coefficients, the computer-executable instructions are to cause one or more of the at least one programmable circuit to:

cause the matrix multiplier circuitry to generate a vertical forward transform of the first TU; and cause the matrix multiplier circuitry to generate a horizontal forward transform of the first TU subsequent to generation of the vertical forward transform.

13. The non-transitory computer-readable medium of claim 12, wherein the computer-executable instructions are to cause one or more of the at least one programmable circuit to:

cause the matrix multiplier circuitry to generate a horizontal inverse transform of the first TU subsequent to generation of the first forward transform of the first TU; and cause the matrix multiplier circuitry to generate a vertical inverse transform of the first TU subsequent to generation of the horizontal inverse transform to generate a first inverse transform of the first TU.

14. The non-transitory computer-readable medium of claim 11, wherein the second set of coefficients includes 16 coefficients produced in the second clock cycle, and the first set of coefficients includes 8 coefficients produced in the first clock cycle.

15. The non-transitory computer-readable medium of claim 11, wherein the second matrix stores values corresponding to a constant matrix.

16. The system of claim 1, wherein the horizontal and vertical dimensions of the first TU are 64×64, the first set of coefficients for the first TU includes 8 coefficients produced in the first clock cycle, the horizontal and vertical dimensions of the second TU are 4×4, and the second set of coefficients for the second TU includes 16 coefficients produced in the second clock cycle.

17. The method of claim 6, wherein the horizontal and vertical dimensions of the first TU are 64×64, the first set of coefficients for the first TU includes 8 coefficients produced in the first clock cycle, the horizontal and vertical dimensions of the second TU are 4×4, and the second set of coefficients for the second TU includes 16 coefficients produced in the second clock cycle.

18. The non-transitory computer-readable medium of claim 11, wherein the horizontal and vertical dimensions of the first TU are 64×64, the first set of coefficients for the first TU includes 8 coefficients produced in the first clock cycle, the horizontal and vertical dimensions of the second TU are 4×4, and the second set of coefficients for the second TU includes 16 coefficients produced in the second clock cycle.

* * * * *